Figure 9:
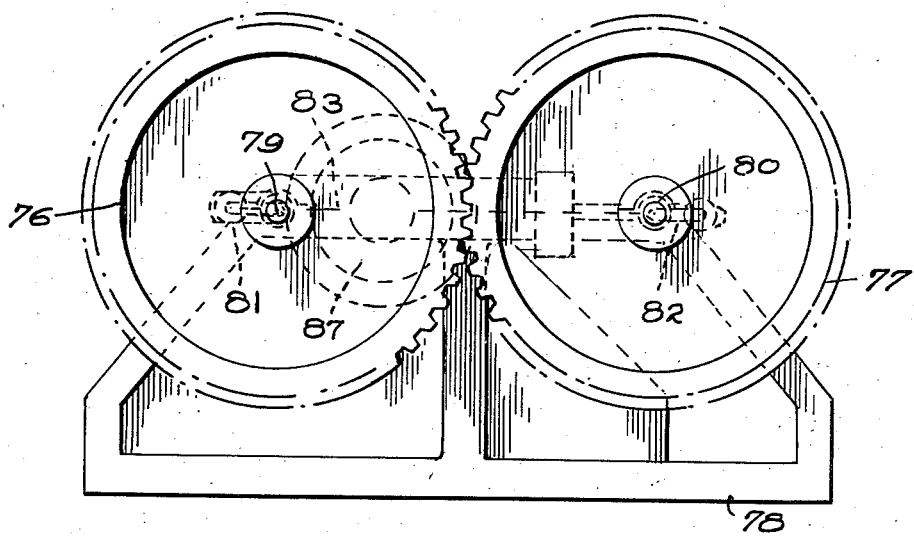

Dec. 5, 1944.  E. G. DOUGHERTY  2,364,429
MECHANICAL MOVEMENT
Filed Oct. 8, 1942   4 Sheets-Sheet 1
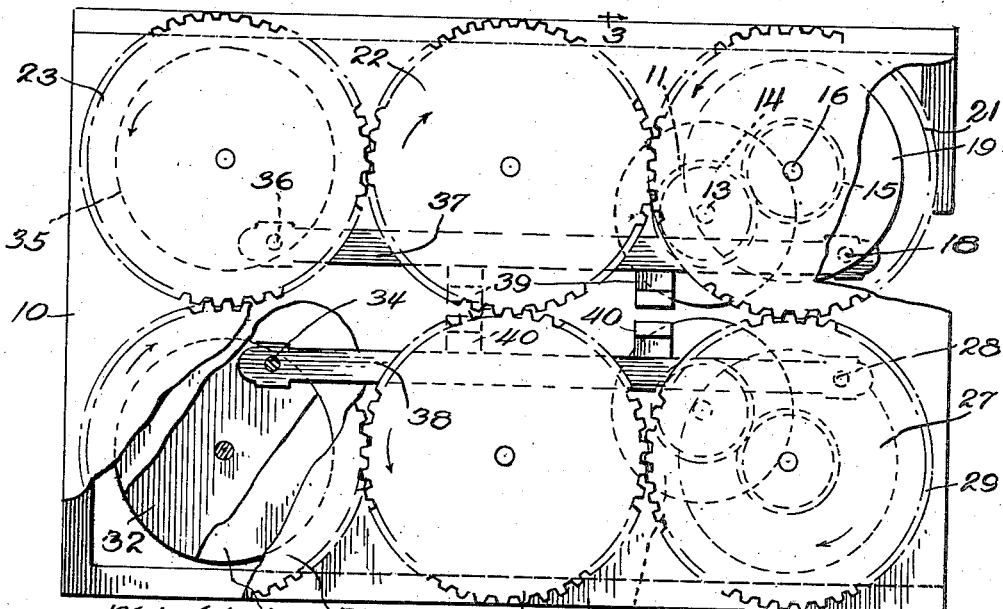
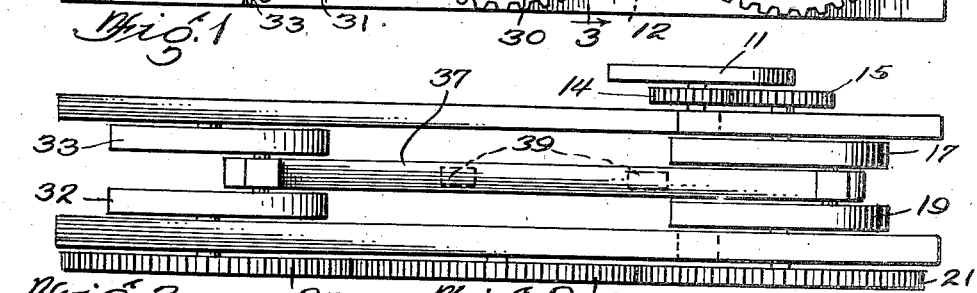
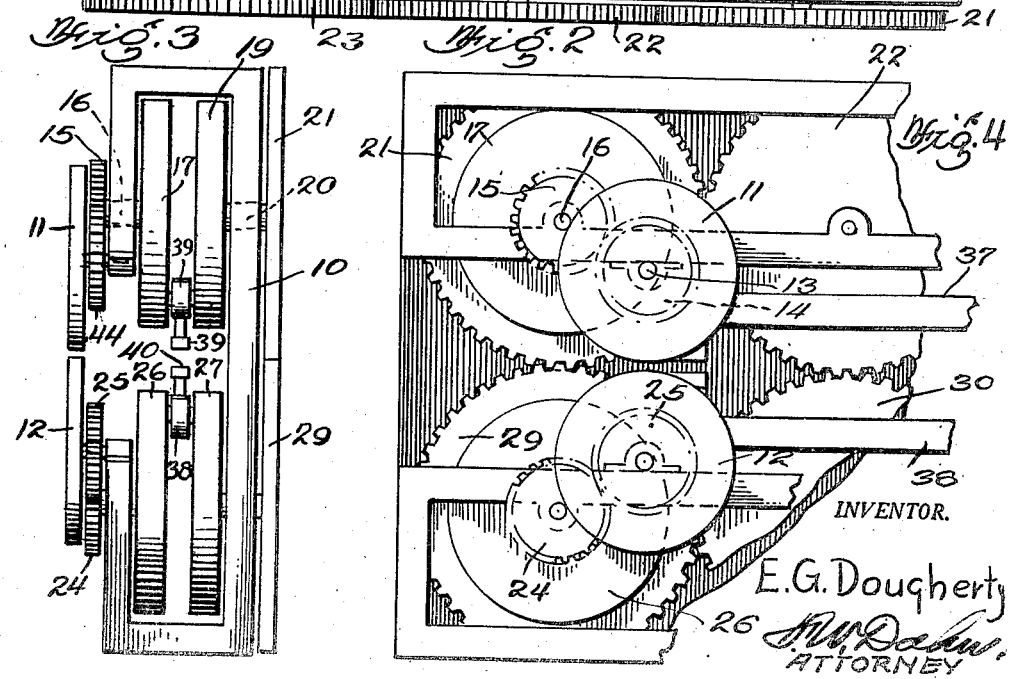
INVENTOR.
E. G. Dougherty
ATTORNEY Dec. 5, 1944.　　　E. G. DOUGHERTY　　　2,364,429
MECHANICAL MOVEMENT
Filed Oct. 8, 1942　　　4 Sheets-Sheet 2
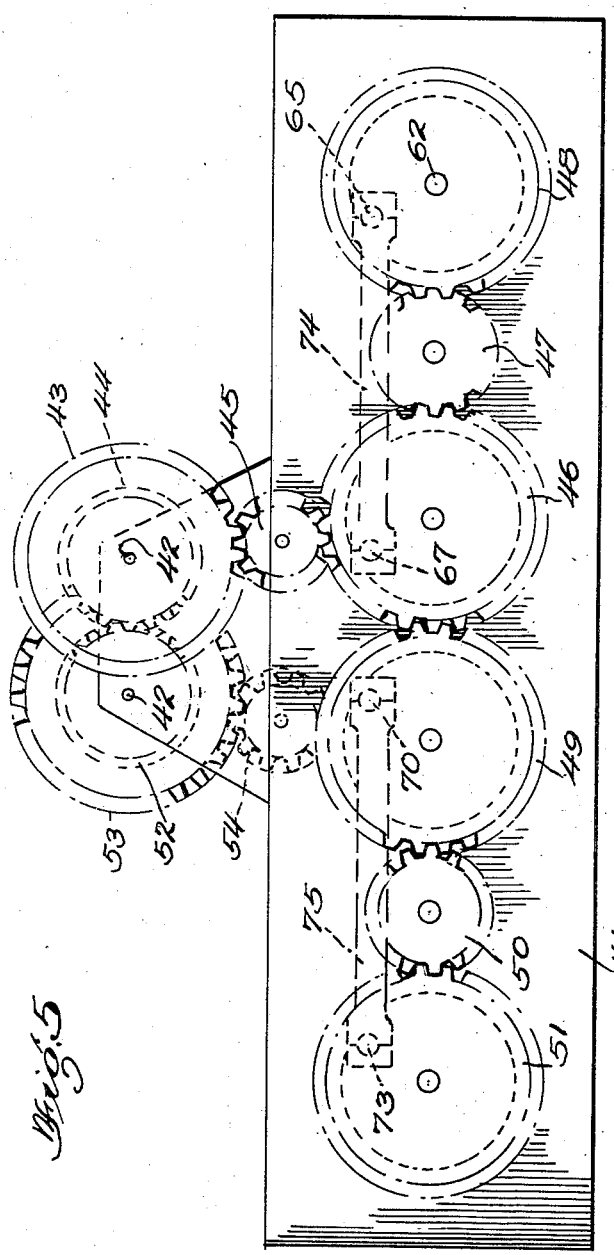
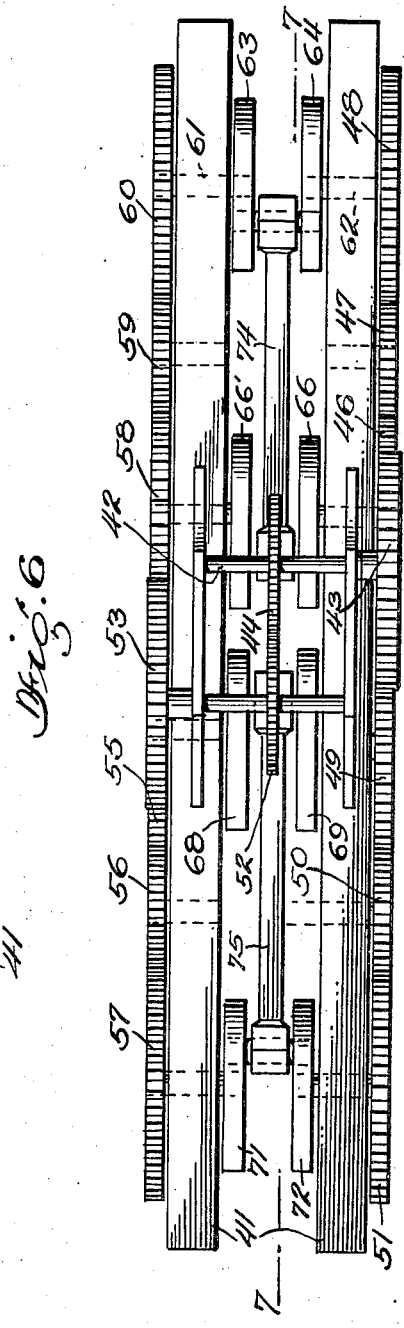
INVENTOR.
E. G. Dougherty
BY
ATTORNEY

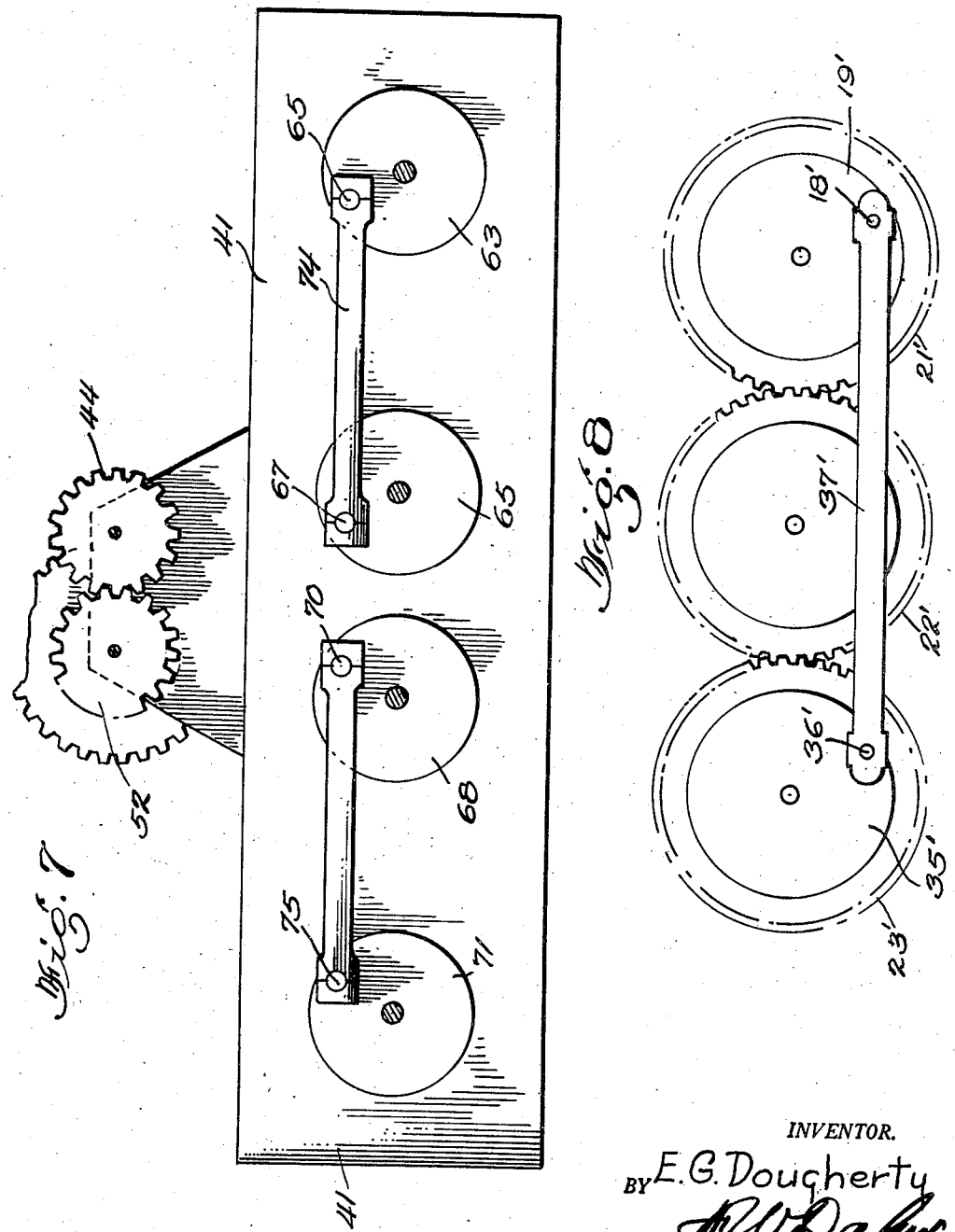

Dec. 5, 1944.  E. G. DOUGHERTY  2,364,429
MECHANICAL MOVEMENT
Filed Oct. 8, 1942  4 Sheets-Sheet 4

INVENTOR.
E. G. Dougherty
BY
ATTORNEY

Patented Dec. 5, 1944

2,364,429

UNITED STATES PATENT OFFICE 2,364,429

MECHANICAL MOVEMENT

Edward G. Dougherty, Fairhope, Ala.

Application October 8, 1942, Serial No. 461,319

13 Claims. (Cl. 74—25)

My invention relates to mechanical movements, and particularly to devices for producing by rotary motion effects similar to those produced by reciprocatory movements by means wherein each point or portion or atom revolves continuously in a perfect circle about its own individual center of rotation without any dwell or reversal in its motion and therefore without any losses of power due to loss of momentum and rebuilding of momentum as occur, for instance, in the reciprocation of the pistons of steam engines of the reciprocatory type.

It is a primary object of my invention to reduce power losses in machinery by doing away with the losses due to the slowing and stopping of reciprocatory parts followed by again bringing them up to full speed at the end of each stroke, as in steam engines and many other devices for converting motion.

Another object is to avoid dead centers, such as commonly occur in machinery for converting motion or power.

Other objects and advantages of my invention will appear upon consideration of the following specification and of the annexed drawings, which are made a part of this application and in which similar reference characters indicate similar parts.

Referring now to the drawings:

Fig. 1 is a side elevation of one form of my invention, with parts broken away,

Fig. 2, a top plan view,

Fig. 3, a section on line 3—3 of Fig. 1, with parts omitted,

Fig. 4, a partial side elevation of parts shown in Fig. 1, viewed from the opposite side of the device.

Figure 10:
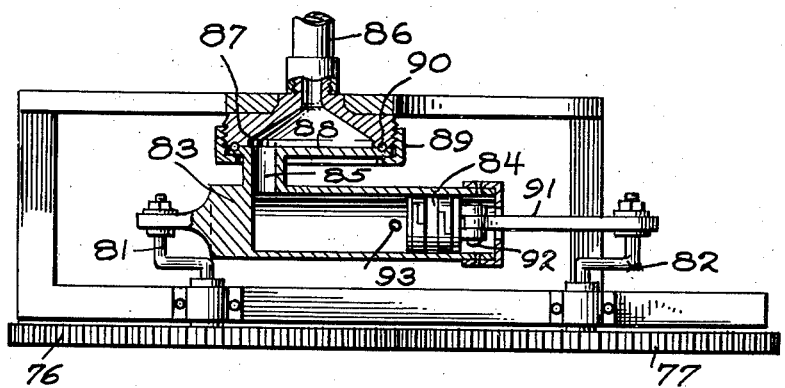

Fig. 5, a side elevation of another embodiment of my invention,

Fig. 6, a top plan of the same,

Fig. 7, a section on line 7—7 of Fig. 6,

Fig. 8, an elevation of a modified form of the invention,

Fig. 9, a side elevation of another form,

Fig. 10, a horizontal section of the same, and

Figure 11:
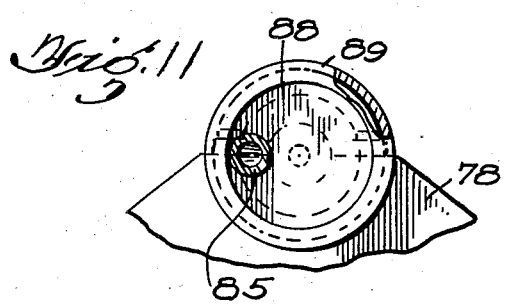

Fig. 11, a detail of parts shown in Fig. 10, partly in section.

In the drawings, reference character 10 indicates a frame of any suitable character for supporting the other parts shown in the illustrative embodiment of Figs. 1 to 4. In this form there are shown upper and lower gears 11 and 12 in mesh with each other. Either one of these gears may be connected to a suitable source of power and may drive the other as well as the remaining parts of the mechanism shown.

The upper gear 11 is mounted on a shaft 13 coaxially with a pinion 14 fixed on the same shaft. Pinion 14 is in mesh with a pinion 15 on a shaft 16 to which is secured a disk 17 connected by a wristpin 18 (Fig. 1) to another disk 19 on a shaft 20 having a gear 21 secured thereto, said gear meshing with a gear 21 which in turn meshes with a gear 22, all journaled on the frame 10.

The gear 12 is connected in similar manner, by means of pinions 24, 25, disks 26, 27 and a wristpin 28 to a second train of gearing comprising gears 29, 30, 31 meshing with each other and respectively in mesh with gears 21, 22, 23 of the train above them. All the disks herein shown may serve as flywheels.

The gears 23 and 31 (Fig. 2) are integral with, or rigidly secured to, disks such as above described, gear 31 being fast to coaxial disks 32, 33 which are connected by a wristpin 34, and gear 23 being fast to similar disks in the upper part of the frame, only one of these disks being shown at 35, and said disks being connected by a wristpin 36.

The upper wristpins 18 and 36 carry a connecting rod 37, and the lower wristpins 34 and 28 carry a connecting rod 38. In this embodiment of the invention these connecting rods are shown as provided with projections 39 and 40 arranged in opposed pairs, the individual projections extending respectively upward and downward from the said connecting rods in such positions that each projection 39 will engage the opposed projection 40 at the time of nearest approach of the connecting rods, or nearly so, according to the conditions of use. These projections serve to illustrate possible uses of the movement, as for example they may represent opposed grippers for feeding a strip of material through a machine, said strip passing in a horizontal plane through the machine and being fed intermittently. Or the one projection of each pair may carry a punch and the other may form or be arranged as a coacting die or bed, whereby a sheet of material fed through the machine in appropriately timed relation with the movement of the punching means may be provided with holes or indentations at predeterminedly spaced intervals.

In some cases the intermediate gears 22 and 30 may be omitted. Again, one or the other of these gears may be the driving gear for the entire movement, if desired. In the latter case the movement can consist for some purposes of only the two trains of gearing at the front of Fig. 1 together with the connecting rods and a suitable framework. The gearing may have friction gears instead of toothed gears and other variations will occur to those skilled in the art of power transmission. It will be evident that the connecting rods lie in the same plane and move in that plane, which plane is here shown as vertical though it may be at any inclination or in any position; also that the axes of the gears in each train lie in a plane common to all of them and parallel to the plane of the axes of the other train.

In the form of the invention shown in Figs. 5 to 7 a frame 41 has an upward extension carrying a shaft 42 provided at one end with a gear 43 and at an intermediate point with a gear 44, both fast to the shaft. A pinion 45 is driven directly by gear 43, said pinion being in mesh with a gear 46 which in turn drives a gear 48 through a pinion 47. At its opposite side the gear 46 meshes with a gear 49 which through a pinion 50 drives a gear 51.

The pinion 44 meshes with a pinion 52 fixed to a shaft carrying a gear 53 at the remote side of the mechanism in Figs. 5 and 6, said gear engaging a pinion 54 below the gear and in turn driving a gear 57 through a train including gears 55 and 56. At its opposite side the gear 53 engages with a gear train comprising gears 58 and 60 and an interposed pinion 59 for driving gear 60.

The pinions 47, 50, 56 and 59, like the gears 22 and 30 in the form first described, are shown as simply mounted on stub shafts in the frame 41, which shafts will usually be stationary though they may rotate if desired, but the gears 48 and 60 are fixed to one another by means of shafts 61, 62, disks 63, 64 and a wristpin 65 (Fig. 5) so as to rotate in unison. In like manner the gears 46 and 58 are united by means including the disks 66, 66' and a wristpin 67; the gears 49 and 55 by means including the disks 68, 69 and a wristpin 70; and the gears 51 and 57 by means of disks 71, 72 and a wristpin 73.

Wristpins 65 and 67 are joined by means of a connecting rod 74, and wristpins 70 and 73 by a connecting rod 75. It will be seen that in the movement of these parts these rods will remain always in alinement with each other and at the same level with one another though they move upward and downward, approaching each other and receding from one another as the gears rotate, while at the same time every point in the make-up of all the movable parts illustrated will revolve in a perfect circle about its own center of rotation. In a mechanism of the sort shown in Figs. 5 to 7 the rods may be supplied, in one possible method of use, with blades coacting as a pair of shears to sever strip material fed vertically between them either constantly or intermittently, or they may form apertures in such material, apply dabs of adhesive thereto, etc. But here, as in the form first described, I do not limit myself to any particular use of the devices but desire to claim broadly the mechanical movements having the characteristics herein set forth.

Under some circumstances it may be desirable to take off power from such parts as the connecting rods in Fig. 1, as by attaching a cylinder to one of them and a piston to the other. Or it might be desirable to drive in the reverse direction, as by connecting the said rods to a source of power. It will be evident also that the principles of my invention may be carried out without the employment of either frictional or toothed gears, since the disks such as shown at 17, 32 etc., could be driven by appropriately arranged belt gearing or the like.

In the modified form of the invention shown in Fig. 8, there are included only the three gears 21', 22', and 23' in a train corresponding to that at the upper part of Fig. 1, together with disks 19' and 35' connected by rod 27' secured to the disks at 18' and 36' respectively. Obviously the connecting rod could be attached directly to the gears if preferred, and this rod could be provided with a projection such as that at 39 in Fig. 1, or other like device. Any one of the parts may be the driver and the others will be driven in accordance with my principle of changing rotary to reciprocatory motion and vice versa.

In the further modification shown in Figs. 9 to 11 rotary motion is converted into reciprocatory motion in very simple manner by means of a pair of meshing gears 76, 77, either of which may be driven by a suitable prime mover and the respective gears being shown as mounted in a frame 78 on shafts 79 and 80. Shaft 79 has a crank 81 and shaft 80 has a crank 82, these cranks being set 180° apart so that they approach and recede from one another in the rotation of their shafts. Between the two cranks there is shown a cylinder 83 and a piston 84 is arranged in the cylinder, these parts being operated by and carried on the cranks 81 and 82. It will be evident that as the gears rotate the cranks must turn and move the cylinder and piston alternately toward and from each other, while at the same time every point at which energy is received or transmitted (sometimes referred to as energy contact points) on all the parts moves in a perfect circle, and that the relative reciprocation of the cylinder and the piston will transmit power that may be used in many ways, as for punching, cutting or stamping material and in many other mechanical operations.

In these figures I have illustrated one method of use of this form of my invention in mechanical movements, according to which method of use a piston and a cylinder are reciprocated so as to operate as an air compressor or air pump, the interior chamber of the cylinder being connected by a tubular member 85 to a conduit 86 leading to any desired receptacle or the like. Desirably, though not necessarily, guiding means are provided to hold the piston and cylinder in alinement, and it will be obvious that the particular form of such guiding means is immaterial, many forms being usable according to convenience or desire. In the present instance guiding means is shown comprising a circular head 87 on the conduit 86, said head coacting with a flange 88 on the cylinder upon which flange the tube 85 is eccentrically mounted, the flange 88 being secured to the head 87 by an internally threaded flanged collar 89. Preferably roller bearings are mounted between the end of head 87 and the adjacent face of flange 88 to reduce friction, as shown at 90 (Fig. 10). The piston 84 is connected to its crank 82 by a rod 91, here shown as pivoted to both the crank and the piston to prevent possible binding of the piston. Air is supplied to the piston chamber by any suitable means, as a valve 93 in the cylinder wall.

One obvious advantage of my construction for many purposes resides in its speed of operation, as compared with other mechanisms having oscillatory or reciprocatory parts. It will be obvious to those skilled in the art that many changes may be made in the parts and arrangements herein shown and described, all without departing from the spirit of the invention; and therefore I do not limit myself to what is so shown or described, but only as indicated by the appended claims.

Having thus fully described my invention, what I claim is:

1. A mechanical movement comprising a plurality of circular elements rotatable in a common plane, means for rotating the circular elements of a pair of said elements oppositely to those of another adjacent pair, and a link for each of said pairs, the links lying in a common plane other than the first-mentioned plane and being so connected to one another as to alternately approach each other and recede from one another as said circular elements are rotated.

2. A device as in claim 1, said links being parallel to each other.

3. A device as in claim 1, said links being arranged in alinement with each other.

4. A mechanical movement comprising a plurality of pairs of gears all located in a common plane, a pair of links, each of said links connecting a gear of a pair to a gear of another pair, connections between the gears of said pairs for causing the gears connected by one of said links to rotate oppositely to those connected by the other of said links, the points of connection of the links to the gears being such that the links are always alined with each other and so approach and recede with relation to each other in the rotation of the gears.

5. A mechanical movement as in claim 4, including gears interposed between the link-connected gears and in driving relation therewith.

6. A mechanical movement comprising sets of gears all of said gears being located in a common plane, alined links connecting a pair of gears in each set, and means connecting gears of one of said sets to gears of the other set so as to cause the gears connected by one of said links to rotate oppositely to those connected by the other link, whereby said links are made to approach and recede from each other in the operation of the device while remaining alined.

7. A mechanical movement comprising sets of gears including gears all lying in a common plane, links in each set connecting a pair of said co-planar gears, and means connecting the gears of one of said sets to those of the other set so as to cause the link-connected gears of one set to rotate oppositely to those of the other set, whereby said links approach and recede from each other in the operation of the device.

8. A mechanical movement as in claim 7, the links being parallel and remaining in the same plane at all times.

9. A mechanical movement as in claim 7, including gears interposed between the link-connected gears in each of said sets and in driving relation therewith.

10. A mechanical movement comprising sets of gears, the gears of said sets being located in a common plane and the axes of the gears in each set lying in a common plane, the plane of gears of the axes of one set being parallel to the plane of the axes of the other set, a link in each set connecting a pair of gears in said set, and means for rotating the similarly-located gears of said sets in opposite directions, whereby said links remain parallel throughout the operation of the mechanism.

11. A mechanical movement as in claim 10, each of said sets of gears including a gear interposed between the gears of one of said link-connected pairs and in driving relation therewith.

12. A mechanical movement as in claim 10, correspondingly located gears in the respective pairs being in driving relation with each other.

13. A mechanical movement as in claim 10, each of said sets of gears including a gear between and in driving relation with the gears of one of said link-connected pairs, and correspondingly located gears in the respective sets being in driving relation with each other.

EDWARD G. DOUGHERTY.